United States Patent
Niitti

(10) Patent No.: US 8,062,519 B2
(45) Date of Patent: Nov. 22, 2011

(54) GASKET DISTRIBUTOR

(75) Inventor: Timo Niitti, Kuopio (FI)

(73) Assignee: Outotec Oyj, Espoo (FI)

( * ) Notice: Subject to any disclaimer, the term of this patent is extended or adjusted under 35 U.S.C. 154(b) by 186 days.

(21) Appl. No.: 12/351,039

(22) Filed: Jan. 9, 2009

(65) Prior Publication Data

US 2010/0176072 A1     Jul. 15, 2010

(51) Int. Cl.
*B01D 17/025*     (2006.01)

(52) U.S. Cl. .................. 210/207; 209/172; 209/172.5; 210/221.1; 210/519; 210/532.1; 210/538

(58) Field of Classification Search .......... 210/198.1, 210/199, 209, 513, 519, 532.1, 538, 540, 210/207, 220, 221.1; 209/158, 172, 172.5, 209/173; 285/125.1, 189, 405, 422, 423, 285/106, 207; 277/605, 606, 608
See application file for complete search history.

(56) References Cited

U.S. PATENT DOCUMENTS

| | | | | |
|---|---|---|---|---|
| 1,544,712 A | * | 7/1925 | Zwicky | ............ 210/123 |
| 2,031,849 A | * | 2/1936 | O'Leary | ........... 285/123.4 |
| 2,592,848 A | * | 4/1952 | Baird | ............ 138/37 |
| 2,714,958 A | * | 8/1955 | Evans | ........... 209/158 |
| 2,777,715 A | * | 1/1957 | Beyer | ............ 285/112 |
| 2,991,884 A | * | 7/1961 | Shackmann et al. | ..... 210/784 |
| 3,308,951 A | * | 3/1967 | Evans | ............ 209/158 |
| 4,690,436 A | * | 9/1987 | Hehl | ............ 285/321 |
| 4,913,807 A | | 4/1990 | Hendricks | |
| 6,264,040 B1 | | 7/2001 | Mankosa et al. | |
| 6,425,485 B1 | * | 7/2002 | Mankosa et al. | ..... 209/164 |
| 6,953,123 B2 | | 10/2005 | Niitti | |

FOREIGN PATENT DOCUMENTS

| DE | 102006050783 | 5/2008 |
|---|---|---|
| EP | 1 254 700 | 6/2002 |
| GB | 992494 | 5/1965 |

OTHER PUBLICATIONS

PCT International Search Report dated Mar. 30, 2010, entire document.
Finland Search Report dated Nov. 27, 2009 for Finnish Patent Application No. 20095011.

* cited by examiner

*Primary Examiner* — Joseph Drodge
(74) *Attorney, Agent, or Firm* — Allen Dyer Doppelt Milbrath & Gilchrist

(57) ABSTRACT

A flange joint for connecting two objects in a fluid connection so that fluid can flow between the objects. The flange joint has a gasket, and the gasket is installed in the flange joint. The flange joint has at least one channel for feeding additional fluid from outside of the flange joint through the gasket into fluid flowing between the two objects.

19 Claims, 4 Drawing Sheets

GASKET DISTRIBUTOR

FIELD OF THE INVENTION

The invention relates to a flange joint for connecting two objects in a fluid connection so that fluid can flow between the objects, to a hindered-bed settler for separating particles of hydrous slurry, and also to a method for preventing clogging in an apparatus comprising several objects between which fluid flows.

BACKGROUND OF THE INVENTION

While moving solids inside an object or an apparatus or inside a part of apparatus (for example, in a pipeline or similar with fluid for the sake of transportation, sizing or classifying), problems occur when for some reason the fluid moves forward but does not carry the solid material with. The motion of the solid material then slows down and finally stops. The solid material starts to accumulate and ends up with blocking the object.

For the above mentioned reason water should be added on the way continuously for process reasons or temporarily for improved material flow, to open a blockage or to add for example reagents into a process flow in a pipeline or in a process equipment.

SUMMARY OF THE INVENTION

Hence there is a need for a flange joint that has a special gasket for fluid distribution in order to easily add fluid feeder points during initial installation or, if necessary, afterwards as well.

The object of the invention is thus to provide a flange joint with a gasket which alleviates the problems mentioned above.

The invention relates to a flange joint having a gasket and the said gasket being installed in the flange joint and that the flange joint has at least one channel for feeding additional fluid from outside of the flange joint through the gasket into fluid flowing between two objects. A normal gasket in a flange joint can be replaced with a gasket according to the invention where the gasket has at least one distribution channel for fluid such as water. Also chemicals and gases can be distributed in said at least one channel. When using a flange joint having a gasket that has at least one distribution channel for fluid there is no need to weld fluid pipes to the settler or any other pipe work.

The present invention relates particularly to a hindered-bed separator or a hindered-bed settler or similar separator or a thickener or a cyclone or a flotation cell or a settler apparatus or other type of equipment handling with solids that can settle in the equipment and block the valve of the equipment (hereinafter "hindered-bed settler") to partition solid particles in hydrous slurry or pulp into two or more fractions containing particles of different size and density. The present invention can also be used in a connection with other equipments where solids are moved with fluid for the sake of transportation, sizing or classifying. In this application fluid stands for any liquid or gas that can flow.

Many sizing and classifying methods employ gravity of solid material in hydrous slurry with an incoming feed containing the material encountering an upward fluid flow. The variation in size and/or density will result in heavier particles falling to a lower level and lighter particles being uplifted to an overflow level thus affecting the desired separation.

The hindered-bed settler handling solid material such as sand material, mineral slurries, hydrous slurries, pulp or other same kind of material (hereinafter "hydrous slurry") comprises a body defining an inner space, having a plurality of feed points for even fluid distribution, advantageously water distribution, at a lower portion of the chamber. At the upper portion of the chamber is a separate feed well means for introducing hydrous slurry into the inner space of the hindered-bed settler. All the material flows downward until it is discharged into the main chamber at a desired level. In the chamber heavy, faster settling particles move downwardly and are removed through coarse feed outlet by various means for example through a valve. The rising fluid, advantageously water, carries light particles upward over the top of the inner space of the body into the overflow launder. The heavier solid material sinks downward while the lighter solid material goes upward.

Beneath the feed points for fluid such as water the inner space of the body is closed by a colonial dewatering or liquid separation cone with an outlet valve at the bottom. The heavier solid material, the coarse feed, sinks to the bottom part of the cone where the grains of the coarse feed will stay close to each other while the fluid such as water flows between them. The body can be closed by a part shaped other than conical for example by a narrowing shaped part.

Problems occur in the lower part of the hindered-bed settler when fluid such as water runs away from the solid material and the motion of the solid material becomes slower, the material settles and finally blocks the valve.

What is desired in a hindered-bed settler handling solid material is that fluid such as water needs to be added either continuously for process reasons or temporarily for improved material flow or to open a blocked valve.

Usually the distribution of fluid such as water takes place through different sorts of nozzles, holes in a box-type structure or holes in a pipe. Adding fluid feeder points to the hindered-bed settler after installation, if necessary, is difficult. This is especially true if the tank has some kind of lining such as rubber that will then be damaged. The same is true in regard of painting.

The idea of the invention is that in order to prevent the hindered-bed settler handling with solids to be blocked, fluid such as water has to be added to the lower part of the said hindered-bed settler. In other words fluid such as water is needed in the cone part of the hindered-bed settler or in the narrowing shaped part of the hindered-bed settler. In order to add a fluid channel to a hindered-bed settler a flange joint with a specially made gasket installed in a flange joint is coupled in the hindered-bed settler.

In a preferred embodiment of the invention the gasket is at least partly made of polymer, advantageously of polyurethane. In another preferred embodiment of the inventions the gasket is at least partly made of flexible material such as rubber. Other materials can also be used to form the gasket, for example plastics or metal. Advantageously the gasket has at least one distribution channel allowing fluid such as water to leak from a main fluid channel into the process tank or pipe. The gasket is handy advantageously in cases when fluid such as water has to be distributed just above a bottom discharge valve of a hindered-bed settler.

These and other objects, aspects and advantages of the invention will be better understood in view of the drawings and the following detailed description of preferred embodiments.

DETAILED DESCRIPTION OF PREFERRED EMBODIMENTS

In the FIGS. 1 and 2 the hindered-bed settler 1 for separating particles in hydrous slurry and preferred embodiments and variations of the hindered-bed settler 1 will be described.

Figure 1:
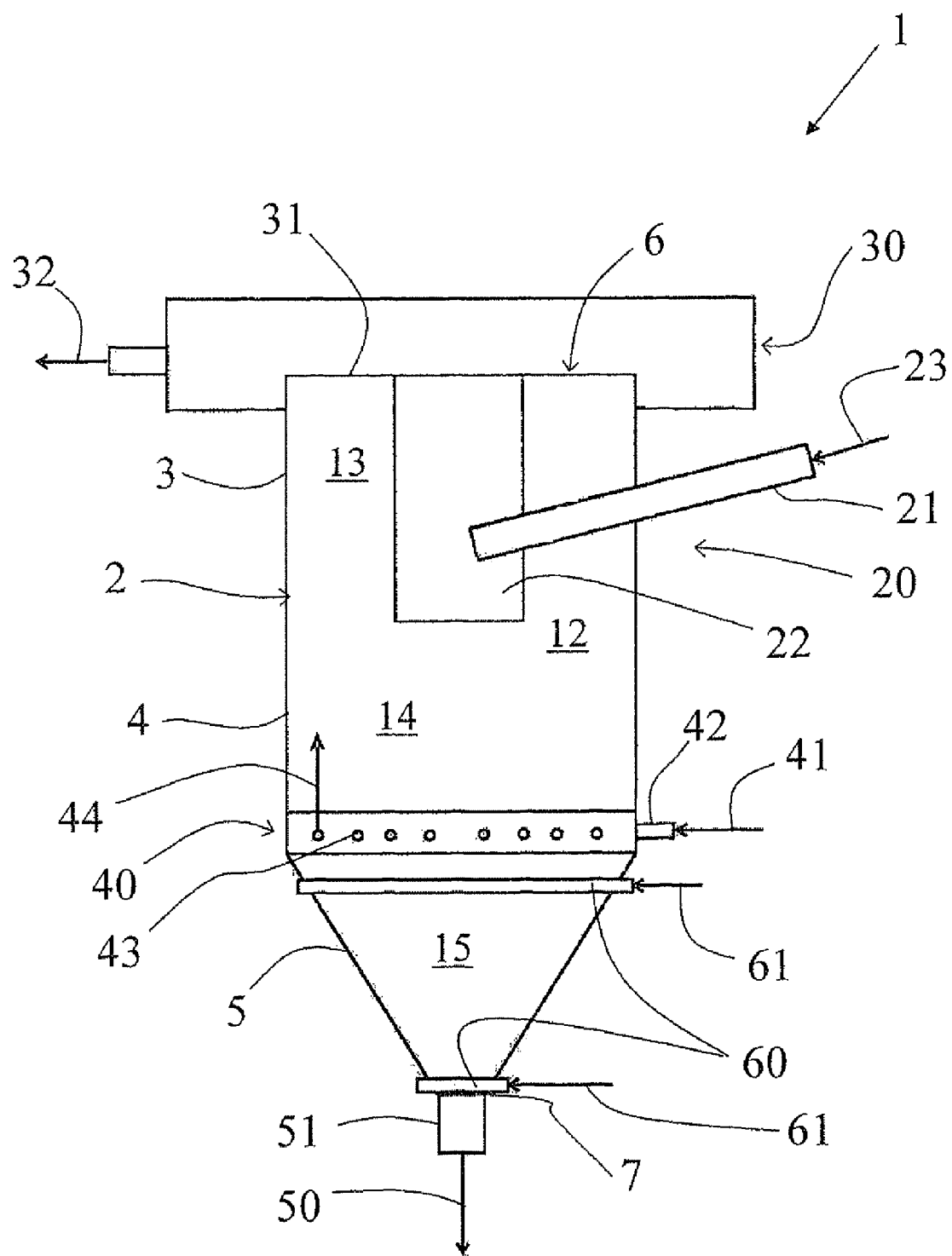
FIG. 1 shows a hindered-bed settler generally with flange joints according to the invention.

The FIG. 1 shows a general view of a hindered-bed settler 1. The hindered-bed settler 1 comprises a body 2 defining an inner space 12. The body 2 of the hindered-bed settler 1 is advantageously either circular or rectangular and having an upper part 3, a middle part 4 and a lower part 5 and an open top 6 and a bottom 7 defining the inner space 12 with an upper portion 13, a middle portion 14 and a lower portion 15. At the bottom 7 of the settler 1 is an outlet valve 51 through which coarse feed 50 flows. The coarse feed 50 flow is indicated by an arrow.

The hindered-bed settler 1 comprises also a feed well means 20 for introducing hydrous slurry into the inner space 12 of the body 2. The feed well means 20 comprise an inlet pipe 21 and a feed well 22. Hydrous slurry 23 enters the inlet pipe 21 and this entry of hydrous slurry 23 is indicated by an arrow. The inlet pipe 21 introduces hydrous slurry into the feed well 22 and the feed well 22 which is mounted inside the upper portion 13 of the settler 1 introduces the slurry to the settler 1. From there the particles of greater mass will migrate downward and particles of less mass will be dispersed into the upper levels of the hindered-bed settler 1 carried by the water.

The hindered-bed settler 1 also comprises an overflow launder 30 for launder flow 32, which is fluid such as water and fine material such as light particles, exiting from the inner space 12 of the body 2. The overflow launder 30 is arranged adjacent to the open top 6 of the body 2. The overflow launder 30 comprises an overflow weir 31 adjacent to the open top 6 of the body 2 for providing launder flow 32 containing light particles to the overflow launder 30.

Teeter water inflow 41 enters intake pipe 42. Intake pipe 42 is a part of teeter water distribution means 40 which comprises teeter water pipes 43. Distribution means 40 is arranged at least partly in the inner space 12 of the body 2 for introducing teeter water 44 into the inner space 12 of the body 2 and directing water there from. The teeter water distribution means 40 is arranged for introducing teeter water 44 into the lower portion 15 of inner space 12 of the body 2. In teeter water pipes 43 water is discharged through small holes in different directions but resultant flow in general takes an upward direction because only very small amounts of teeter water 44 will be discharged with coarse feed.

The hindered-bed settler 1 comprises also an outlet valve 51 at the bottom 7 of the body 2 of the hindered-bed settler 1. The coarse feed 50 flows through the outlet valve 51. The coarse feed 50 flow is indicated by an arrow.

The lower part 5 of the body 2 comprises at least one flange joint 60, in this embodiment two flange joints 60 according to the invention, for feeding additional fluid from outside of the body 2 of the hindered-bed settler 1 into the lower portion 15 of the inner space 12 of the body 2 of the hindered-bed settler 1. The two joints 60 are arranged to the lower portion 15 of the hindered-bed settler 1. Each flange joints 60 have a specially made gasket installed in said flange joints 60. Fluid inflow 61 enters the flange joints wherefrom fluid such as water is directed to the lower part 15 of the hindered-bed settler 1 to help the coarse feed 50 to move or maintain its motion.

Figure 2:
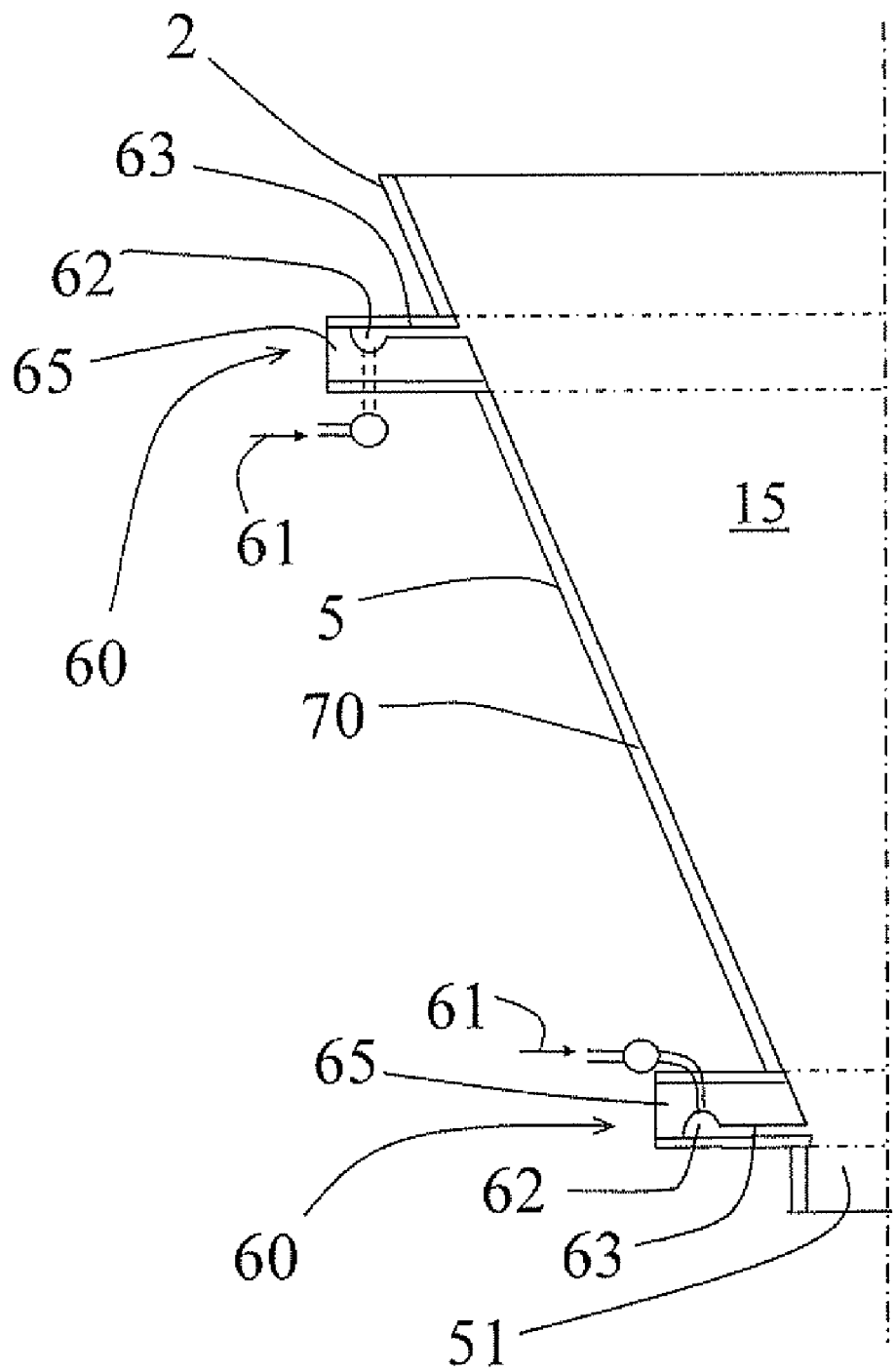
FIG. 2 shows a detail view of the lower part of the hindered-bed settler with flange joints.

The FIG. 2 shows a detail view of a part of the lower part 5 of the hindered-bed settler 1 with two flange joints 60. The upper flange joint 60 is for fluid such as water distribution for process and the lower flange joint 60 is for improved material flow through the main outlet valve 51. The at least one flange joint 60 has at least one channel 67, 62, 63 for feeding additional fluid from outside of the flange joint 60 through the gasket 65 into the lower portion 15 of the inner space 12 of the body 2 of the hindered-bed settler 1. Each flange joint 60 has a specially made gasket installed in the flange joint 60. The specially made gasket to the flange joint 60 is preferably but not necessarily an annular component that has a main channel 62 for fluid and preferably but not necessarily smaller distribution channels 63 for fluid to move into the lower portion 15 of the hindered-bed settler 1. The gasket is made in such a way for example of polymer, preferably of polyurethane, that it has distribution channels 63, preferably radial distribution channels, allowing fluid such as water to leak from the main fluid channel 62 into the lower portion 15 of the hindered-bed settler 1. When the solid material classifies, the coarse grains sink to the bottom of the hindered-bed settler 1 and they will stay relatively close to each other so that the fluid such as water flows between them. When the solid material layer becomes tighter, the fluid flows away and the motion of the material slows down. Eventually the solid material blocks the outlet valve 51 and fluid such as water has to be added to ease the flow or to open the blockage. In the figure there are two flange joints 60. The lower flange joint 60 is just above the outlet valve 51. It is convenient in cases where the coarse feed has blocked the outlet valve 51 and fluid such as water has to be added to improve the material flow. The upper flange joint 60 adds fluid such as water to the upper part of the lower portion 15 of the hindered-bed settler 1. The fluid is needed to lubricate the solid material so that the motion of the solid material becomes faster.

Fluid inflow 61 enters the flange joints 60. The fluid inflow 61 to the upper flange joint 60 is in a different place than in the lower flange joint 60 and the same is with the position of the main fluid channels 62 and the distribution channels 63. This is only one embodiment and the place and position can vary within the scope of claims.

The lower part 5 of the hindered-bed settler 1 is traditionally cast in steel. In one preferred embodiment the lower part 5 has a lining such as rubber or polymer lining inside the body 2. In another preferred embodiment the lower part 5 of the hindered-bed settler 1 is made of polymer such as polyurethane as a PU-casting so that it has a thick polyurethane layer because the wear is at the lower part 5 of the hindered-bed settler 1 more intense. The lower part 5 of the hindered-bed settler 1 could also be partly made of polymer such as polyurethane. In still another preferred embodiment shown in the FIG. 2 a part of the lower part 5 of the hindered-bed settler 1 is made of one module consisting two flange joints 60 and in between the two flange joints 60 is arranged a part 70. The part 70 is preferably made of polymer such as polyurethane and tapers in one direction. The part 70 and the gasket 65 inside the flange joints 60 are made of the same material preferably polyurethane and said part 70 is fitted to the gasket 65 to compose one single piece.

Figure 3:
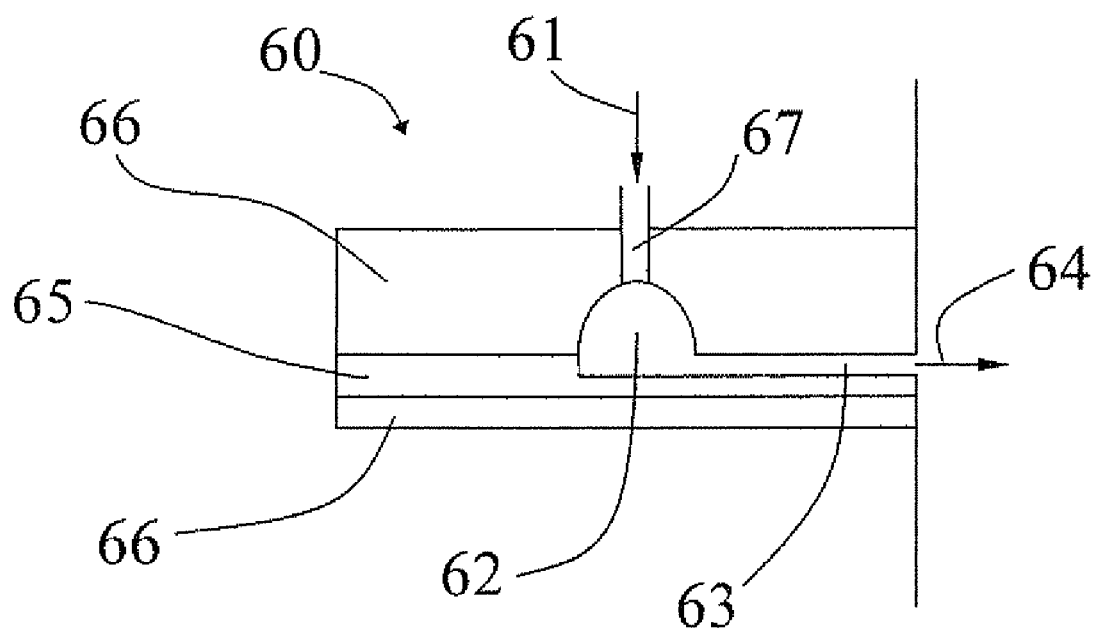
FIG. 3 shows a cross section view of a flange joint according to the invention.

The FIG. 3 shows one embodiment of a cross section view of a flange joint 60 according to the invention. The flange joint 60 has at least one channel 67, 62, 63 for feeding additional fluid from outside of the flange joint 60 through the gasket 65 into the lower portion 15 of the inner space 12 of the body 2 of the hindered-bed settler 1. Said one channel 67, 62, 63, comprises a fluid entrance channel 67, a main fluid channel 62 and at least one distribution channel 63 so that the fluid entrance channel 67 is connected to the main channel 62 to feed additional fluid from the outside of the gasket 65 into the main fluid channel 62. The main fluid channel 62 is connected to the distribution channel 63 to feed additional fluid from the main fluid channel 62 into the said distribution channel 63 and the said distribution channel 63 is configured to feed additional fluid into fluid flowing between two objects, in this embodiment to feed fluid to the lower portion 15 of the hindered-bed settler 1.

The flange joint 60 is made in such a way that between the flanges 66 is a gasket 65, preferably of polyurethane but other material is also possible. The gasket 65 has a main fluid channel 62 and at least one distribution channel 63. The distribution channel 63 can be radial. In this embodiment the main fluid channel 62 is partly formed in the gasket 65 and partly formed in the flange 66 of the flange joint 60, to be exact in the upper part of the flange 66 of the flange joint 60. Fluid inflow 61 enters the flange joint 60 via a fluid entrance channel 67 from above to the main fluid channel 62 and moves or in other words leaks from the main fluid channel 62 to the distribution channel 63. Fluid moves along the distribution channel 63 and results in a fluid outflow 64 to the settler 1. Fluid inflow 61 can also be from side or from under of the flange joint 60 via a fluid entrance channel 67.

Figure 4:
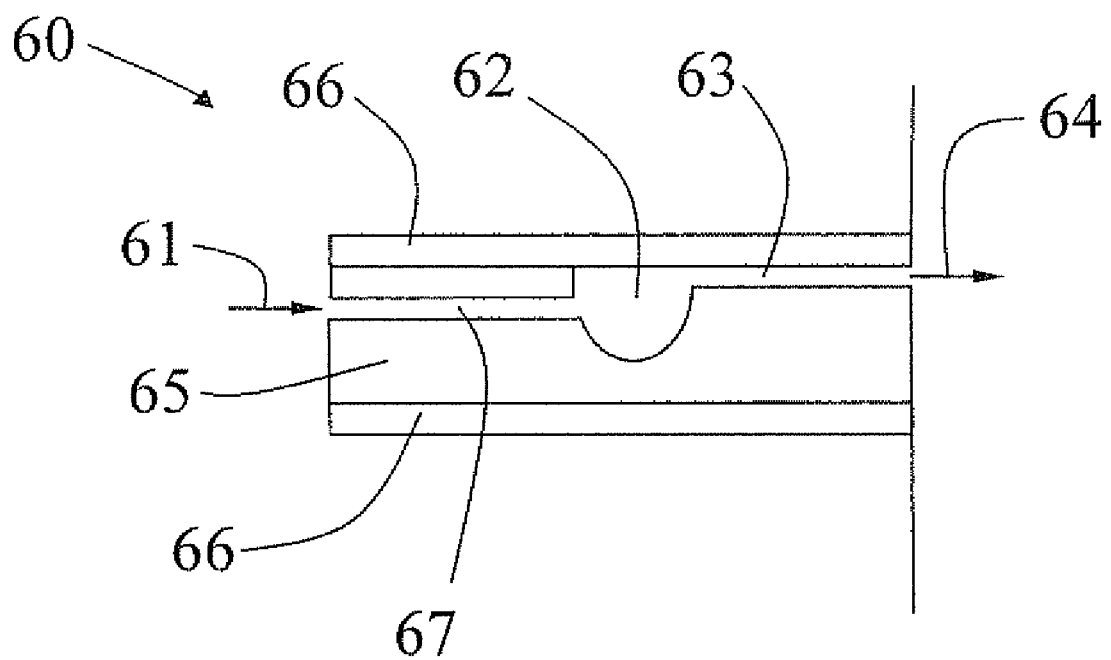
FIG. 4 shows a cross section view of another flange joint according to the invention.

The FIG. 4 shows another embodiment of a cross section view of another flange joint 60 according to the invention. The flange joint 60 is made in such a way that between the flanges 66 is arranged a gasket 65, preferably of polyurethane but other material is also possible. The gasket 65 according to the invention can replace the normal gasket that is in a normal flange joint. In this embodiment the gasket 65 has a main fluid channel 62 formed in the gasket 65 and at least one distribution channel 63 arranged also in the gasket 65. The distribution channel 63 can be radial. In this preferred embodiment the flange 66 is planar and does not have any channels in it, but it is also possible to form the main fluid channel 62 in a flange 66 of the flange joint 60.

The fluid inflow 61 enters via a fluid entrance channel 67 from the side of the flange joint 60 and moves along the fluid entrance channel 67 to the main fluid channel 62 and moves or in other words leaks form there to the distribution channel 63. From distribution channel 63 fluid such as water results in as a fluid outflow 64 to the settler 1. Fluid inflow 61 can also be from above or from under of the flange joint 60, but in that case the flange 66 does not stay untouched but needs to have an entrance channel 67 for the fluid.

Figure 5:
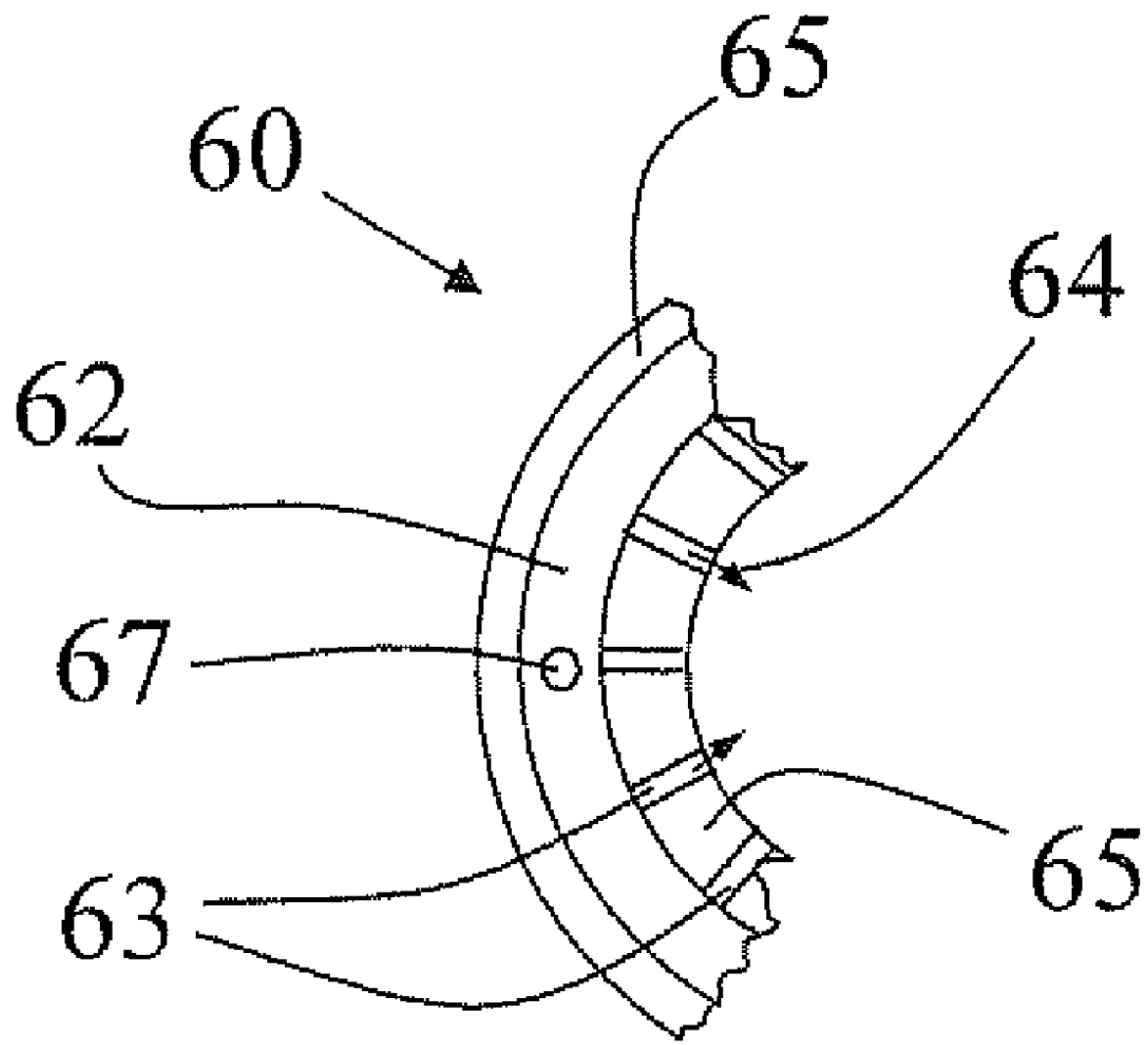
FIG. 5 shows a horizontal cross section view of a section of a flange joint presented in FIG. 3.

The FIG. 5 shows one embodiment of a horizontal cross section view of a section of a flange joint 60 presented in FIG. 3. This cross section view is from a spot where all the features are in the gasket part 65 so the flange 66 itself does not show. The flange joint 60 has a main fluid channel 62 formed or partly formed to the gasket 65. In this preferred embodiment the fluid such as water comes via a fluid entrance channel 67 from above to the main water channel 62. From the main fluid channel 62 the fluid such as water moves or in other words leaks to the distribution channel 63. The number of distribution channels 62 can vary from one flange joint to another but in general there can be one or several fluid distribution channels 63 in a flange joint 60. From distribution channel 63 the fluid such as water results as a fluid outflow 64 to the settler 1. Although it is said that the distribution channel 63 is preferably radial it can also be of another kind. The distribution channel 63 can be in a glancing direction in respect of the radius. In other words the distribution channel 63 can be directed tangentially or almost tangentially so that the flow from the distribution channel 63 creates a rotational flow in the hindered-bed settler 1. This rotational flow can be favourable to the separation process.

The invention relates also to a method for preventing clogging in an apparatus comprising several objects between which fluid flows and said method comprising the steps of: providing a flange joint 60 for connecting two objects of the apparatus in a fluid connection, providing a gasket 65 in the flange joint 60 and providing at least one channel 67, 62, 63 into the flange joint 60 for feeding additional fluid from outside of the flange joint 60 through the gasket 65 into fluid flowing between the two objects of the apparatus.

The invention also relates to a method for preventing clogging in a hindered-bed settler 1 comprising the steps of: using a hindered-bed settler 1 comprising a body 2 defining an inner space 12, wherein the body 2 comprising an upper part 3, a middle part 4, a lower part 5, an open top 6 and a bottom 7 defining the inner space 12 with an upper portion 13, a middle portion 14 and a lower portion 15, wherein said hindered-bed settler 1 including a feed well means 20 for introducing hydrous slurry 23 into the inner space 12 of the body 2, an overflow launder 30 for launder flow 32, teeter water distribution means 40 for feeding teeter water 44 into the lower portion 15 of inner space 12 of the body 2 and an outlet valve 51 for the coarse feed 50 flow, providing at least one flange joint 60 in the lower part 5 of the body 2, wherein each flange joint 60 having a gasket 65, and at least one channel for feeding additional fluid from outside of the flange joint 60 into the lower portion 15 of the inner space 12 of the body 2 of the hindered-bed settler 1, and feeding additional fluid from outside of the flange joint 60 through said at least one channel 67, 62, 63 into the lower portion 15 of the inner space 12 of the body 2 of the hindered-bed settler 1.

In the flange joint 60 according to the invention the at least one channel 67, 62, 63 is provided in a flange 66 of the flange joint 60 or the at least one channel 67, 62, 63 is provided in the gasket 65 or the at least one channel 67, 62, 63 is provided partly in a flange 66 of the flange joint 60 and partly in the gasket 65.

A hindered-bed settler 1 can have one or several flange joints 60 with a specially made gasket 65 installed in the flange joint 60. When having several flange joints 60 in a hindered-bed settler 1 the flange joints 60 can differ from each other. The gasket 65 inside the flange joint 60 can be different in different flange joints 60. The gasket 65 can contain all the elements of the fluid distribution in the gasket 65 part so that the entrance channel 67 where the fluid such as water enters, the main fluid channel 62 and distribution channels 63 are all built in the gasket 65. The amount of distribution channels 63 can vary from one to several. On the other hand the gasket 65 can contain said channels only partly and partly they can be within the flange 66. The fluid entrance channel 67 can be formed in the flange 66, in the gasket 65 or partly in both the flange 66 and the gasket 65. The main fluid channel 62 can be formed into the other half of the flange 66 or alternatively into the gasket 65 itself or partly in both the gasket 65 and the flange 66. In such a case where the main fluid channel 62 is formed into the gasket itself the gasket 65 will become thicker and be manufactured for example as polyurethane casting so that there is enough room also for fluid entrance channel 67. When using polyurethane casting it is easy to change the number or size of the distribution channels 63 either by machining or preferably by using loose fillings in the PU-mold. The entrance channel 67 can be essentially in vertical direction or in a glancing direction connecting to the main channel 62 from above or from under. The entrance channel 67 can also be essentially in horizontal direction or in a glancing direction connecting to the main channel 62 from side. There can be one or several fluid entrance channels 67 in one flange joint 60.

The flange 60 consists of two flanges 66 and a gasket 65. One flange 66 is above the gasket 65 and the other flange 66 is under the gasket 65. The flange joint 60 is pulled together with bolts that tighten the gasket 65 between the flanges 66. The bolts are not shown in the figures.

Fluid flows from the distribution channel 63 with a high speed to the hydrous slurry in the lower portion 15 of the settler 1. The fluid outflow 64 generates an induced secondary fluid flow around the opening of the distribution channel 63. With the secondary fluid flow coarse grains may hit the wall of the settler 1 and the flange 66 as well as the gasket 65. The result of this is that the wall and the flange 66 may wear and the gasket 65, too, but usually the wear in the steel is faster than in PU. Sometimes mechanical wear becomes an issue in the flange 66. The gasket 65 can be made in such a way that the number of bolts in the flange joint 60 and the distribution channels 63 in the gasket 65 do not match at any specific point; for example 6 bolts (a standard flange is normally attached with 6 bolts) and 5 or 7 distribution channel 63 slots. If the mechanical wear becomes an issue the flange 66 can be installed in a different position, in other words turned for example 60 degrees clockwise, so that all wear points will change.

It is self evident that this invention can be applied in other types of flange joint, for example rectangular as well. Although above is mentioned only water in connection with the fluid channels also other material like chemicals and gases can be distributed this way.

It is apparent to a person skilled in the art that as technology advanced, the basic idea of the invention can be implemented in various ways. The invention and its embodiments are therefore not restricted to the above examples, but they may vary within the scope of the claims.

That which is claimed is:

1. A settler comprising:
   a body comprising at least two parts;
   a feed for introducing a mixture of solids and fluid into the body such that fluid flows between parts of the body;
   an overflow for receiving a lighter component of the mixture;
   an outlet for receiving a heavier component of the mixture; and
   wherein said body comprises at least one flange joint joining parts of the body, and comprising a gasket for feeding additional fluid from outside of the settler body through the gasket of the flange joint into said body.

2. The settler according to claim 1, wherein said flange joint further comprises a fluid entrance channel, a main fluid channel and at least one distribution channel;
   said fluid entrance channel is connected to the main fluid channel to feed additional fluid from the outside of the gasket into the main fluid channel;
   said main fluid channel is connected to said at least one distribution channel to feed additional fluid from the main fluid channel into said at least one distribution channel; and
   said at least one distribution channel is configured to feed additional fluid into fluid flowing between said parts of the body.

3. The settler according to claim 2, wherein the main fluid channel is formed in a flange of the flange joint.

4. The settler according to claim 2, wherein the main fluid channel is formed in the gasket.

5. The settler according to claim 2, wherein the main fluid channel is partly formed in the gasket and partly formed in a flange of the flange joint.

6. The settler according to claim 1, wherein the gasket is at least partly made of a polymer.

7. The settler according to claim 6, wherein the polymer is polyurethane.

8. The settler according to claim 1, wherein the gasket is at least partly made of a flexible material.

9. The settler according to claim 8, wherein the flexible material is rubber.

10. The settler according to claim 1, wherein the feed comprises a feed well means for introducing a slurry into the inner space of the body.

11. The settler according to claim 1, wherein the overflow comprises an overflow launder for launder flow.

12. The settler according to claim 1, further comprising a teeter water distribution means for introducing teeter water into lower portion of an inner space of the body.

13. The settler according to claim 1, wherein the outlet comprises a valve at the bottom of the settler body for coarse feed flow.

14. The settler according to claim 1, wherein the settler comprises a hindered-bed settler for separating particles from a hydrous slurry mixture.

15. A hindered-bed settler for separating particles of hydrous slurry, said hindered-bed settler comprising:
   a body defining an inner space, the body comprising an upper part, a middle part, a lower part, an open top and a bottom defining the inner space with an upper portion, a middle portion and a lower portion;
   a feed well means for introducing hydrous slurry into the inner space of the body;
   an overflow launder for launder flow;
   teeter water distribution means for feeding teeter water into the lower portion of inner space of the body; and
   an outlet valve at the bottom of the hindered-bed settler for coarse feed flow,
   wherein the lower part of the body comprises at least one flange joint, said at least one flange joint having a gasket, and said at least one flange joint having at least one channel for feeding additional fluid from outside of the flange joint through the gasket into the lower portion of the inner space of the body of the hindered-bed settler.

16. The hindered-bed settler according to claim 15, wherein the lower part of the body comprises two flange joints;
   wherein each flange joint has a gasket;
   wherein at least one of said two flange joints has at least one channel for feeding additional fluid from outside of the flange joint through the gasket into the lower portion of the inner space of the body of the hindered-bed settler; and
   wherein a part is arranged between the two flange joints.

17. The hindered-bed settler according to claim 16, wherein the part tapers in one direction.

18. The hindered-bed settler according to claim 16, wherein the part is made of the same material as the gasket and said part is fitted to the gasket.

19. The hindered-bed settler according to claim 16, wherein the part is made of a polymer.

* * * * *